US011729323B2

(12) United States Patent
Kumagai

(10) Patent No.: US 11,729,323 B2
(45) Date of Patent: Aug. 15, 2023

(54) INFORMATION PROCESSING APPARATUS, METHOD FOR CONTROLLING INFORMATION PROCESSING APPARATUS, AND STORAGE MEDIUM FOR REMOTELY CONFIGURING ICONS ON USER INTERFACES

(71) Applicant: CANON KABUSHIKI KAISHA, Tokyo (JP)

(72) Inventor: Sora Kumagai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/559,996

(22) Filed: Dec. 22, 2021

(65) Prior Publication Data

US 2022/0217243 A1 Jul. 7, 2022

(30) Foreign Application Priority Data

Jan. 6, 2021 (JP) ................................. 2021-000837

(51) Int. Cl.
*H04N 1/00* (2006.01)
(52) U.S. Cl.
CPC ..... *H04N 1/00424* (2013.01); *H04N 1/00411* (2013.01); *H04N 1/00427* (2013.01); *H04N 1/00432* (2013.01)
(58) Field of Classification Search
None
See application file for complete search history.

(56) References Cited

U.S. PATENT DOCUMENTS

| | | | | |
|---|---|---|---|---|
| 6,831,752 | B1* | 12/2004 | Matsuo | G06F 3/1253 358/1.18 |
| 2012/0159364 | A1* | 6/2012 | Hyun | G06F 3/04815 715/848 |
| 2013/0268894 | A1* | 10/2013 | Jeon | G06F 40/143 715/835 |
| 2014/0013254 | A1* | 1/2014 | Hosein | G06F 3/04883 715/765 |
| 2014/0195972 | A1* | 7/2014 | Lee | G06F 3/0482 715/811 |
| 2014/0203999 | A1* | 7/2014 | Shim | G06F 3/0483 345/2.2 |

FOREIGN PATENT DOCUMENTS

WO 2008086302 A1 7/2008

* cited by examiner

*Primary Examiner* — Miya J Williams
(74) *Attorney, Agent, or Firm* — Canon U.S.A., Inc. IP Division

(57) ABSTRACT

An information processing apparatus configured to connect to an external apparatus includes a display control unit configured to control icons to be arranged and displayed in list form on a remote user interface provided to the external apparatus accessing the information processing apparatus, wherein the icons are displayed on a plurality of pages on a local user interface of the information processing apparatus, and a control unit configured to control movement of the icons displayed on the local user interface, in response to an operation on the remote user interface. The display control unit displays a first instruction button in association with an icon included in the icons displayed in list form, and the first instruction button is configured to instruct the control unit to move the icon from a page to another page in the plurality of pages.

20 Claims, 11 Drawing Sheets

FIG.4A

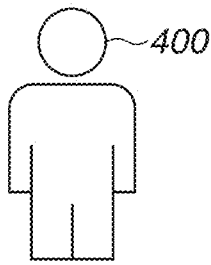

ID: ____ 401a
PASSWORD: ____ 401b
LOG IN 401c

BASIC DEVICE INFORMATION
 DEVICE STATUS
  PRINTER: READY TO PRINT
 ERROR INFORMATION
  NO ERRORS CONFIRMED
CONSUMABLES INFORMATION
 [DETAILS OF CONSUMABLES INFORMATION...]

CHECK STATUS/ CANCEL
SETTINGS/ REGISTRATION — 402a
APPLICATIONS

PREFERENCES
 ▽ PAPER SETTINGS
 ▼ DISPLAY SETTINGS
   DISPLAY SCREEN
   HOME SCREEN REARRANGEMENT
 ▽ TIMER SETTINGS
FUNCTION SETTINGS
 ▽ COMMON SETTINGS
 ▽ COPY SETTINGS
 ▽ FAX SETTINGS
 ▽ SCAN SETTINGS
 ▽ FREQUENTLY-USED SETTINGS
SYSTEM MANAGEMENT SETTINGS
 ▽ SYSTEM MANAGEMENT
 ▽ DEPARTMENT ID MANAGEMENT
 ▽ NETWORK SETTINGS

DISPLAY SCREEN
ERROR INFORMATION
NO ERRORS CONFIRMED

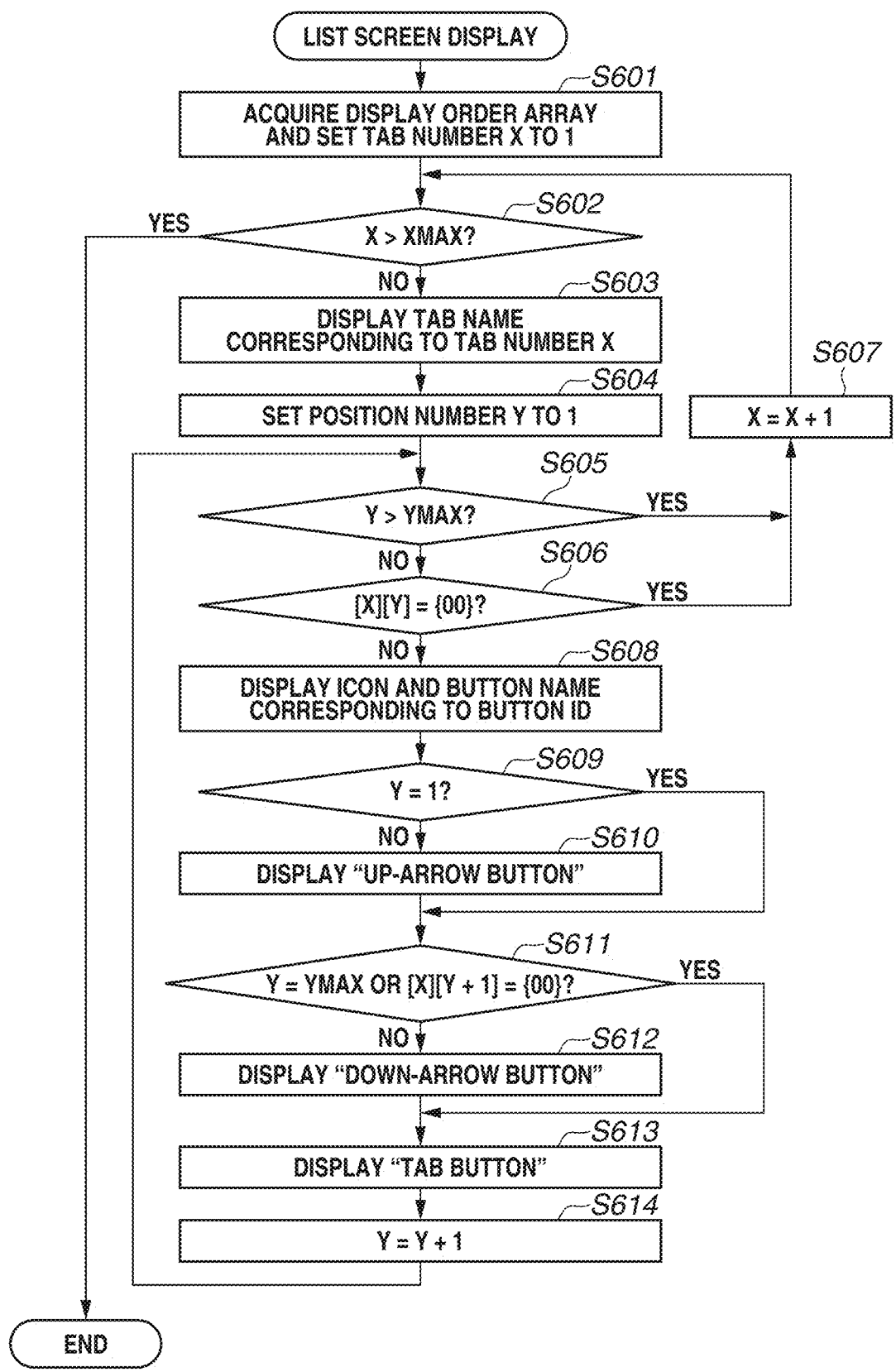

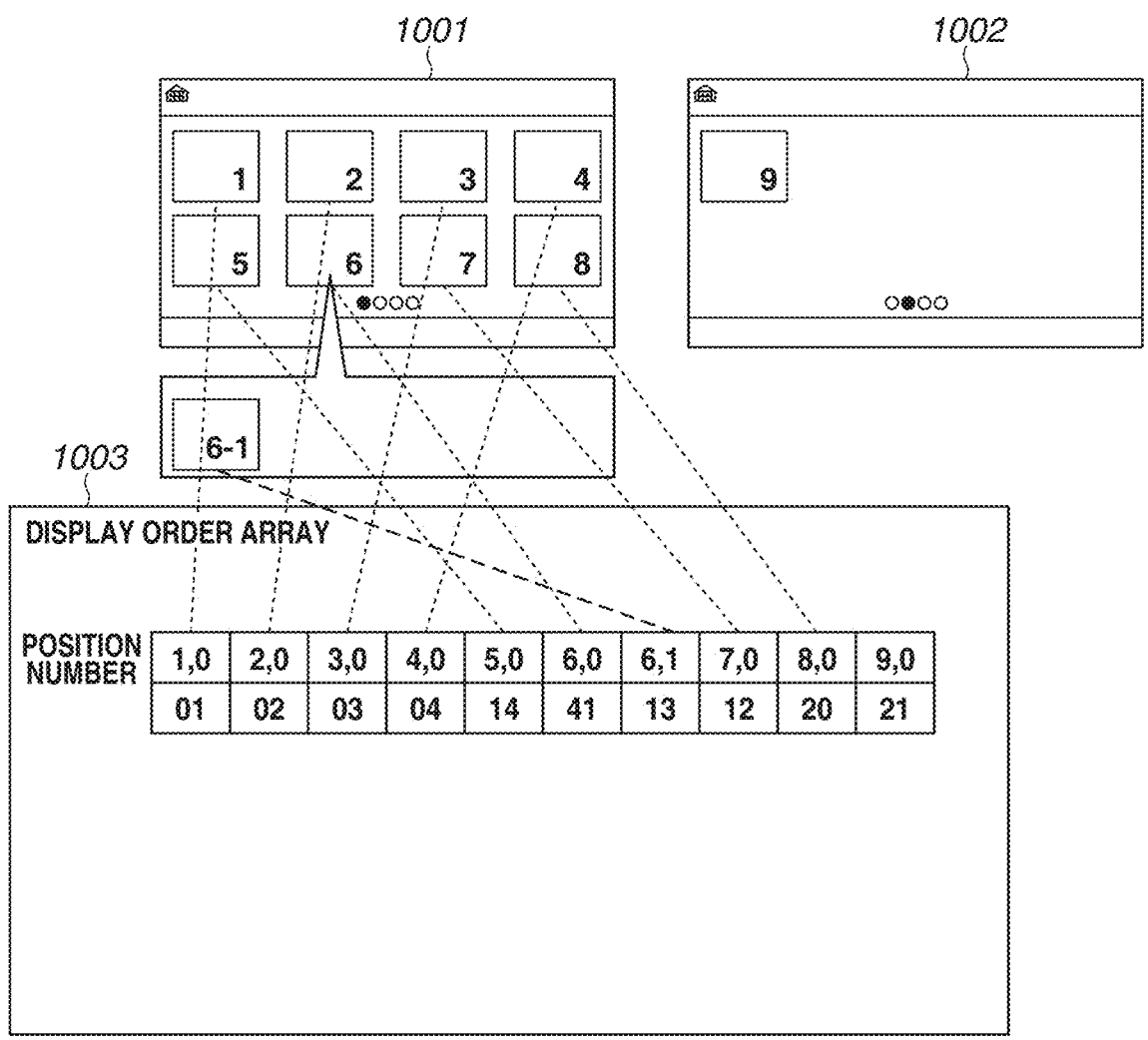

INFORMATION PROCESSING APPARATUS, METHOD FOR CONTROLLING INFORMATION PROCESSING APPARATUS, AND STORAGE MEDIUM FOR REMOTELY CONFIGURING ICONS ON USER INTERFACES

BACKGROUND

Field of the Disclosure

The present disclosure relates to an information processing apparatus configured to connect to an external apparatus, a method for controlling the information processing apparatus, and a storage medium.

Description of the Related Art

There is known a touch screen device including a touch screen. Examples of the touch screen device include a smartphone and a tablet. The touch screen device detects a touch operation of a finger or a pen via the touch screen. The touch screen device operates based on the detected touch operation. The operation based on the detected touch operation is discussed in WO 2008/086302. Some of the touch screen devices have a function of listing icons corresponding to installed applications on a home screen so that a user can execute the installed applications with a simple operation. Furthermore, some of the touch screen devices have a function capable of moving any of the icons on the home screen with a touch operation.

Meanwhile there is a function of displaying the state or setting details of a device connected to a network, on a web browser running on a personal computer (PC) or a smartphone via the network. A user interface (UI) that is displayed on the touch screen of the touch screen device is referred to as a local UI (LUI), whereas a UI that is displayed on the web browser is referred to as a remote UI (RUI). In a case where the RUI is used, the RUI may not enable the display and movement of the icons on the home screen in a similar manner to the LUI, depending on the web browser used.

SUMMARY

Some embodiments of the present disclosure are directed to enhancing user visibility and operability in using a remote user interface.

According to an aspect of some embodiments, an information processing apparatus configured to connect to an external apparatus includes a display control unit configured to control icons to be arranged and displayed in list form on a remote user interface provided to the external apparatus accessing the information processing apparatus, wherein the icons are displayed on a plurality of pages on a local user interface of the information processing apparatus, and a control unit configured to control movement of the icons displayed on the local user interface, in response to an operation on the remote user interface. The display control unit displays a first instruction button in association with an icon included in the icons displayed in list form, the first instruction button being configured to instruct the control unit to move the icon from a page to another page in the plurality of pages.

Further features of various embodiments will become apparent from the following description of exemplary embodiments with reference to the attached drawings.

BRIEF DESCRIPTION I/F THE DRAWINGS

FIGS. 4A to 4C are diagrams each illustrating an example of a remote user interface (RUI) according to the first exemplary embodiment.

FIG. 6 is a flowchart illustrating display control processing.

FIG. 9 is a diagram illustrating a data structure of an LUI according to a second exemplary embodiment.

DESCRIPTION I/F THE EMBODIMENTS

Exemplary embodiments will be described below with reference to the drawings. Hereinafter, an image forming apparatus will be described as an example of an information processing apparatus.

Figure 1:
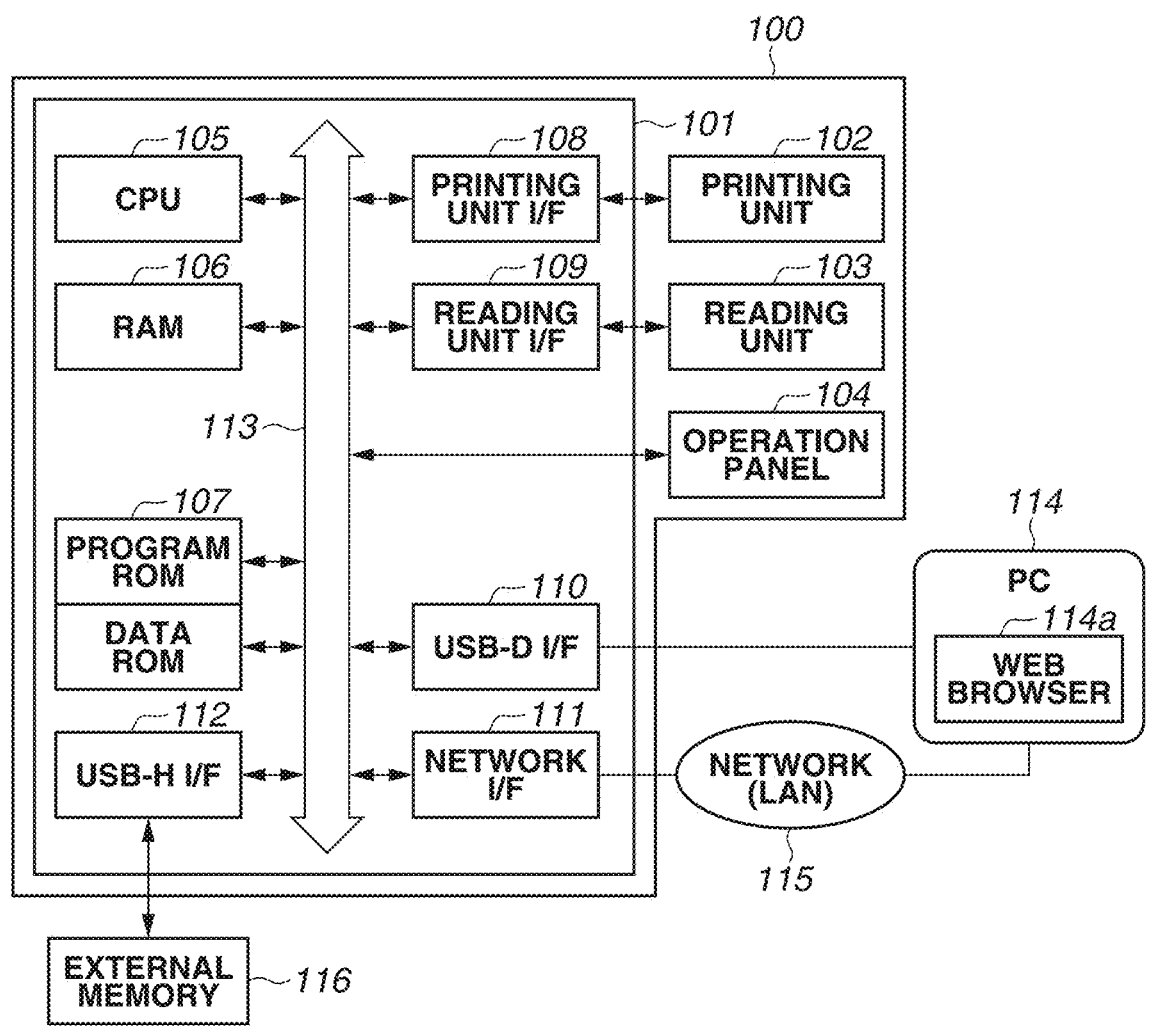
FIG. 1 is a block diagram illustrating an entire configuration of a system including an image forming apparatus according to a first exemplary embodiment.

FIG. 1 is a block diagram illustrating an example of an entire configuration of a system including an image forming apparatus 100 according to a first exemplary embodiment. The system includes the image forming apparatus 100 and a personal computer (PC) 114. The image forming apparatus 100 is connectable to the PC 114 via a network 115. The PC 114 is used by a user. While the system in FIG. 1 includes the single image forming apparatus 100 and the single PC 114, the system may include a plurality of the image forming apparatuses 100 and a plurality of the PCs 114. While in the present exemplary embodiment, the image forming apparatus 100 including an image forming unit configured to form an image is described as an example of an information processing apparatus, the present exemplary embodiment is applicable to any information processing apparatus capable of displaying a local user interface.

The image forming apparatus 100 provides a remote user interface (hereinafter referred to as an "RUI") via the network 115. The RUI can be used from an external apparatus, such as the PC 114. A web browser 114a is installed on the PC 114. The PC 114 accesses the image forming apparatus 100 using the web browser 114a to display the RUI provided by the image forming apparatus 100 on a display. The user can refer to or change settings of the image forming apparatus 100 by using the displayed RUI.

The PC 114 is not limited to a personal computer and may be a tablet computer or a smartphone. In addition, the PC 114 may be configured to access the image forming apparatus 100 by using another client program instead of the web browser 114a. While in the present exemplary embodiment, the configuration in which the PC 114 accesses the image forming apparatus 100 using the web browser 114a is described, the present exemplary embodiment is not limited thereto. The PC 114 is an example of the external apparatus.

As illustrated in FIG. 1, the image forming apparatus 100 is a multifunction peripheral (MFP) including a printing unit 102, a reading unit 103, an operation panel 104, and a controller unit 101. The controller unit 101 controls the printing unit 102, the reading unit 103, and the operation panel 104. The controller unit 101 includes a central processing unit (CPU) 105, a random access memory (RAM) 106, a read-only memory (ROM) 107, a printing unit interface (I/F) 108, a reading unit I/F 109, a universal serial bus (USB)-D I/F 110, a network I/F 111, and a USB-H I/F 112.

The above-described blocks are connected to one another via a system bus 113.

The CPU 105 performs processing illustrated in flowcharts to be described below and various functions by reading various control programs stored in a program area of the ROM 107, loading the programs into the RAM 106, and executing the programs to comprehensively control the above-described blocks. The CPU 105 also performs display control of the RUI and performs control based on an operation on the RUI. Alternatively, the various control programs may be stored in an external memory 116, and the CPU 105 may read the various control programs from the external memory 116 via the USB-H I/F 112 and execute the programs. While the configuration in which the single image forming apparatus 100 performs the processing illustrated in the flowcharts to be described below is described below, a plurality of the image forming apparatuses 100 connected via the network 115 may share the processing illustrated in the flowcharts. The RAM 106 is used as a temporary storage area, such as a main memory or a work area of the CPU 105. The ROM 107 includes a program ROM and a data ROM, and stores the various control programs and various kinds of data including setting information.

The network I/F 111 performs processing for communicating with the PC 114 via the network 115. The network I/F 111 connects to the network 115 via a wired or wireless local area network (LAN). The USB-D I/F 110 performs processing for communicating with the external apparatus via a USB cable. The USB-D I/F 110 is connectable to the PC 114 via the USB cable.

The operation panel 104 includes a keyboard and a touch screen having a touch panel, for example. The operation panel 104 displays a local user interface (hereinafter referred to as an "LUI") under control by the CPU 105, using the setting information stored in the ROM 107. The operation panel 104 also provides the CPU 105 with operation information corresponding to an operation input from a user who operates the image forming apparatus 100. The operation panel 104 is an example of a display unit of the image forming apparatus 100.

The printing unit I/F 108 connects the printing unit 102 and the controller unit 101. Image data to be printed by the printing unit 102 is transferred from the controller unit 101 to the printing unit 102 via the printing unit I/F 108, and is printed on a recording medium by the printing unit 102. The reading unit I/F 109 connects the reading unit 103 and the controller unit 101. The reading unit 103 reads a document placed thereon to generate image data, and inputs the generated image data to the controller unit 101 via the reading unit I/F 109. In the present exemplary embodiment, an application that provides a copy function using the printing unit 102 and an application that provides a scan function using the reading unit 103 are installed on the image forming apparatus 100. The applications installed on the image forming apparatus 100 are not limited thereto.

Figure 2:
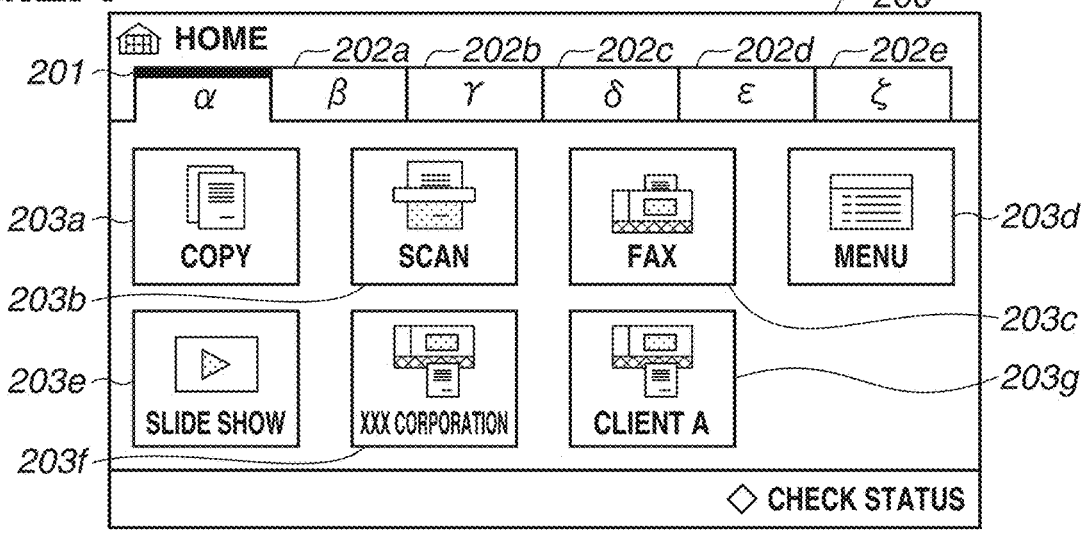
FIGS. 2A to 2C are diagrams each illustrating an example of a local user interface (LUI) according to the first exemplary embodiment.

Next, an example of the LUI will be described with reference to FIGS. 2A to 2C. FIG. 2A illustrates an example of a home screen 200. The home screen 200 enables the user to select an application or function to be executed among the applications and functions running on the image forming apparatus 100. The home screen 200 displays icons on a plurality of pages. Each of the displayed icons is used to issue an instruction to execute the corresponding application or function. The home screen 200 according to the present exemplary embodiment has a tab structure display format, and a tab name is assigned to each tab of the home screen 200. FIG. 2A illustrates a state where a tab with a tab name "α" is displayed as a tab with a tab number 1. Each tab of the home screen 200 lists various icons, such as icons 203a to 203g. For example, in a case where the icon 203a is pressed, the image forming apparatus 100 activates the application that provides the copy function and displays a settings screen on the operation panel 104. FIG. 2B illustrates an example of a copy function settings screen 210.

On the home screen 200 in FIG. 2A, a tab name 201 of a currently displayed tab is highlighted. In a case where one of tab names 202a to 202e of tabs that are currently hidden is selected, the selected tab is displayed on the home screen 200. On each tab of the home screen 200, zero to eight icons can be arranged starting from the upper left corner.

To move an icon using the LUI, an option on an icon settings screen (not illustrated) is selected, or an operation, such as pressing and holding the icon, is performed to enter an icon rearrangement mode. FIG. 2C illustrates an example of an icon rearrangement mode screen 220. In a case where an icon is selected on the icon rearrangement mode screen 220 and the selected icon is moved to another position in the tab or to the position of another tab name by a drag and drop operation, the image forming apparatus 100 performs a display order setting for the icon.

In a case where the selected icon is moved to a hidden icon list 221 illustrated in FIG. 2C by a drag and drop operation, the image forming apparatus 100 performs a hidden icon setting to hide the selected icon. In the present exemplary embodiment, the hidden icon setting refers to a setting to hide an icon for an undeletable application, such as a basic function application on the home screen 200. In a case where a confirm button 222 is pressed after the movement operation is completed, the image forming apparatus 100 confirms the setting of the display order of the icons displayed on the icon rearrangement mode screen 220 or the hidden icon setting, and updates the setting information stored in the ROM 107. The home screen 200 illustrated in FIG. 2A is a mere example, and the forms and arrangement of the various elements, the number of the home screens 200, and how to perform various operations on the home screen 200 may be different from those described above.

Figure 3:
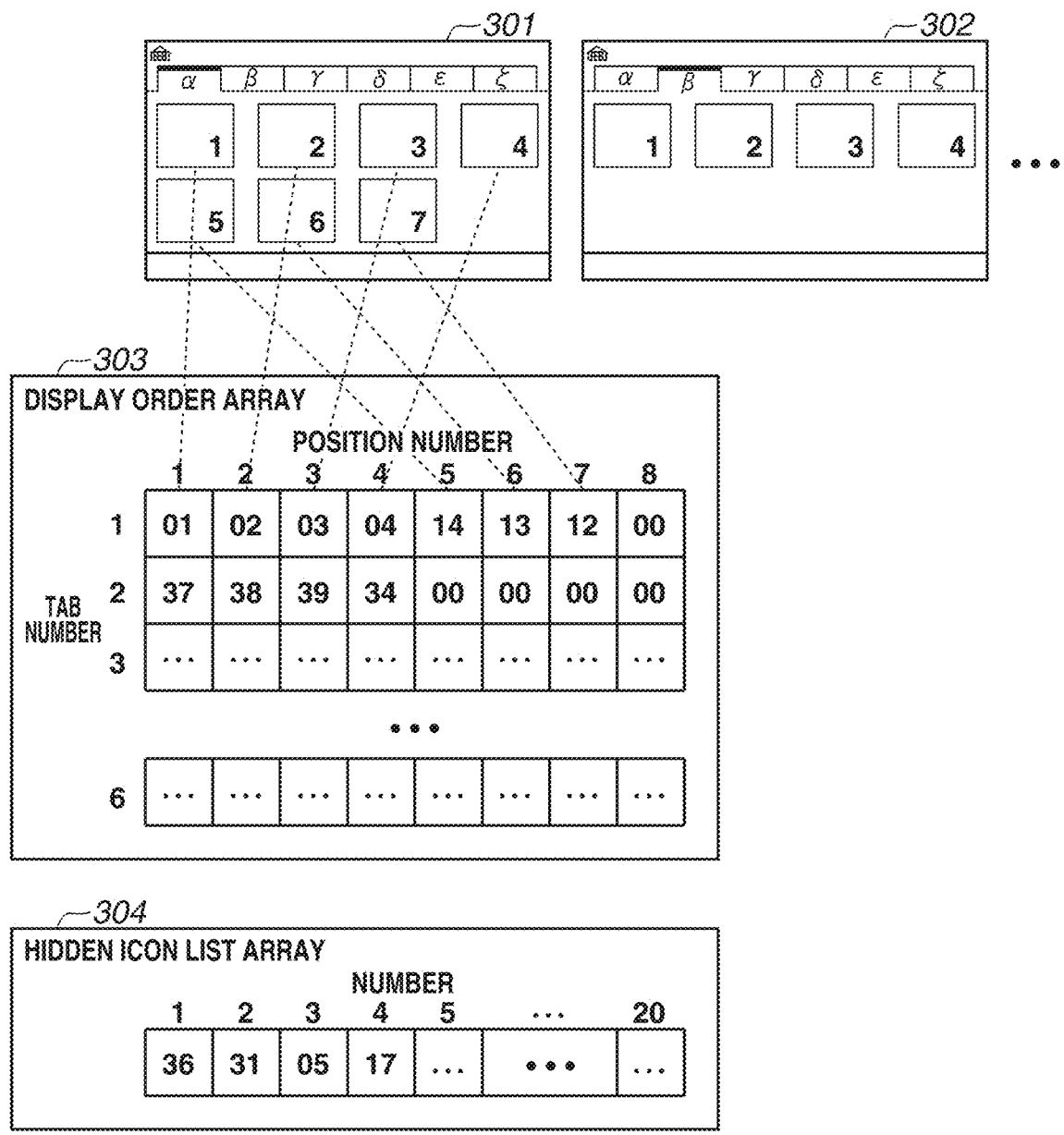
FIG. 3 is a diagram illustrating data structures of the LUI according to the first exemplary embodiment.

FIG. 3 illustrates a data structure that manages the display order of the icons on the home screen 200, and a data structure that manages the icons to be hidden, according to the present exemplary embodiment. In the present exemplary embodiment, the image forming apparatus 100 manages the display order of the icons on the home screen 200 by using a display order array 303. The display order array 303 is a two-dimensional array having tab numbers and position numbers. Furthermore, the image forming apparatus 100 manages the icons to be hidden on the home screen 200 by using a hidden icon list array 304. The hidden icon list array 304 is a one-dimensional array. An upper limit is set for the number of icons that can be registered in the hidden icon list array 304. The display order array 303 and the hidden icon list array 304 are stored in the ROM 107.

Figure 5A:
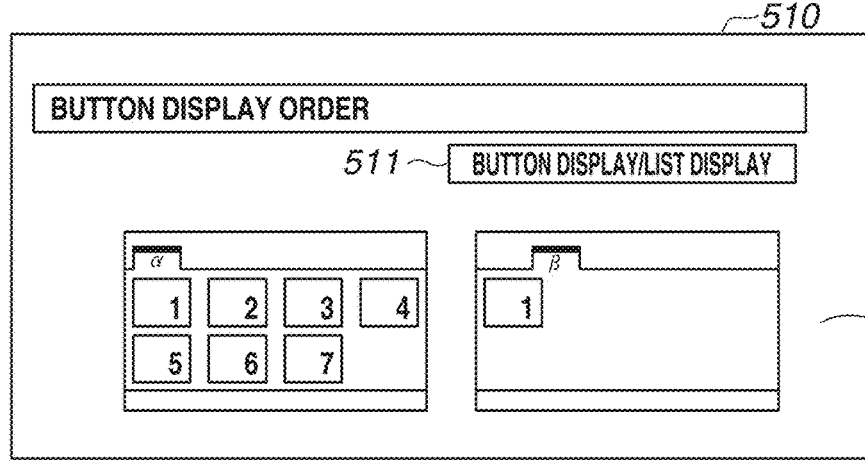
FIGS. 5A and 5B are diagrams each illustrating an example of an icon rearrangement screen according to the first exemplary embodiment.
Figure 5B:
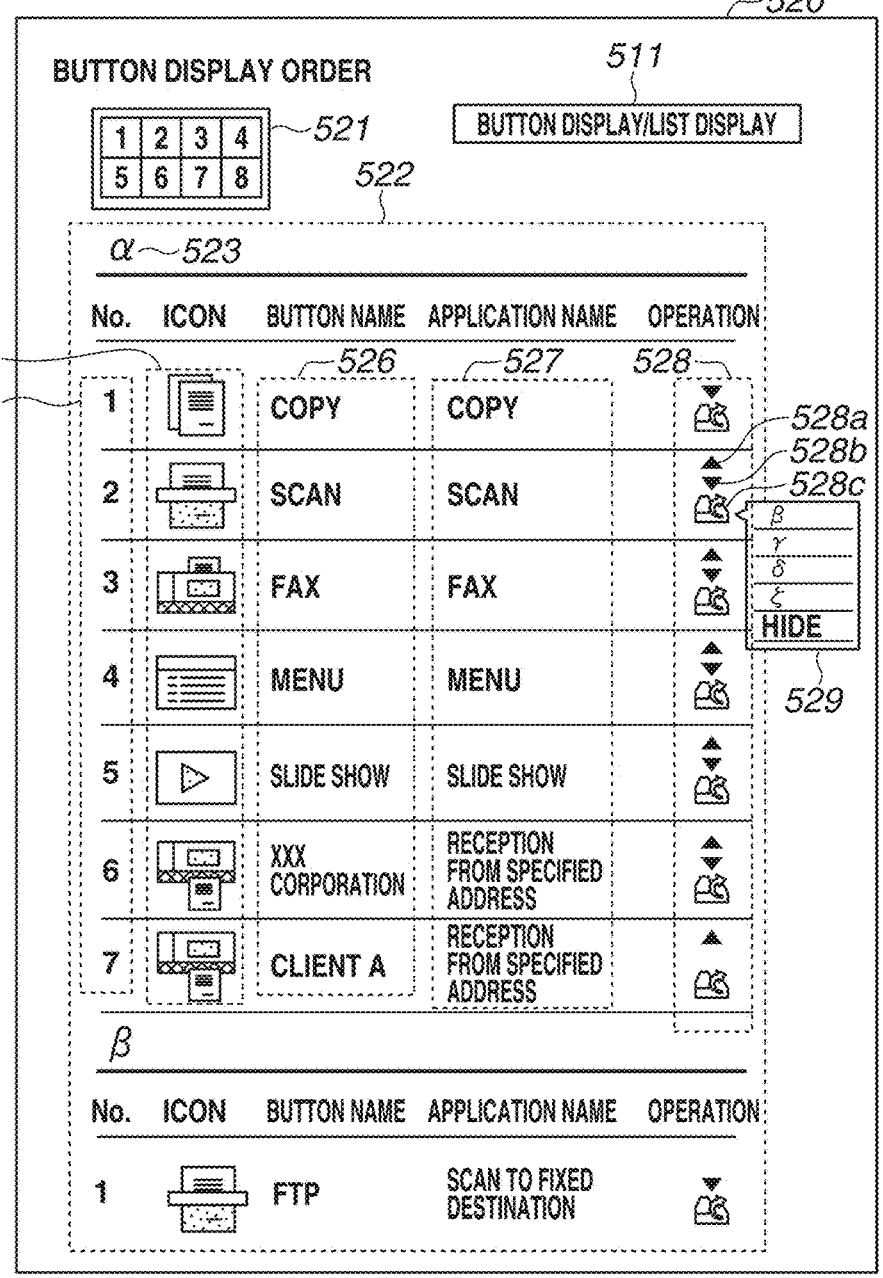

The image forming apparatus 100 reads the display order array 303 and the hidden icon list array 304 when displaying the LUI (e.g., the home screen 200 in FIG. 2A) on the operation panel 104 or when displaying the RUI (e.g., an icon rearrangement screen 520 in FIG. 5B). Furthermore, a button identification (button ID) is set in each area of the display order array 303 and in each area of the hidden icon list array 304. The button ID is a unique value based on the application or function to be executed, and each icon is given the button ID.

In the present exemplary embodiment, the tab numbers are given to the respective tabs of the home screen 200, and the position numbers are numbers given to the display positions of the icons in each of the tabs starting from the upper left corner. The tab numbers are an example of page numbers of pages displayed on the home screen 200. In the present exemplary embodiment, a maximum value of the position numbers is eight. The maximum value of the position numbers is an upper limit of the number of icons that can be displayed in each of the tabs. In each area of the display order array 303, the button ID is set in association with the tab number and the position number of the corresponding icon. Furthermore, the button ID is set at {00} in the area with no corresponding icon.

In the example illustrated in FIG. 3, the image forming apparatus 100 acquires seven button IDs associated with the tab number 1 (the tab name "α"), arranges the icons corresponding to the acquired button IDs in the tab with the tab name "α" starting from the upper left corner in the order of the position numbers, and displays a home screen 301. Similarly, the image forming apparatus 100 acquires four button IDs associated with a tab number 2 (a tab name "β"), arranges the icons corresponding to the acquired button IDs in the tab with the tab name "β" starting from the upper left corner in the order of the position numbers, and displays a home screen 302. Hereinafter, an area with a tab number X and a position number Yin the display order array 303 will be referred to as an "element [X][Y]". The data structures illustrated in FIG. 3 are a mere example, and details of various settings may be different from those described above.

FIGS. 4A to 4C each illustrate an example of the RUI according to the present exemplary embodiment. When the PC 114 accesses the image forming apparatus 100, an authentication screen 401 appears on the display of the PC 114 first.

In FIG. 4A, a user 400 of the PC 114 enters an ID in an ID entry field 401a and a password in a password entry field 401b on the authentication screen 401. The ID and the password are set in advance by using the image forming apparatus 100. In a case where a login button 401c in FIG. 4A is pressed and authentication processing is successfully performed, an RUI top screen 402 appears on the display of the PC 114. This enables the user 400 to use the RUI provided by the image forming apparatus 100. FIG. 4B illustrates an example of the RUI top screen 402. In a case where a settings/registration button 402a on the RUI top screen 402 is pressed, a settings screen 403 for referring to or changing the settings of the image forming apparatus 100 appears on the display of the PC 114. FIG. 4C illustrates an example of the settings screen 403 for performing the settings of the image forming apparatus 100. In a case where a setting item to be changed is selected in a setting item area 403a of the settings screen 403, details of the selected setting item are displayed in a details display area 403b of the settings screen 403 for reference or change.

FIGS. 5A and 5B each illustrate an example of an icon rearrangement screen according to the present exemplary embodiment. The icon rearrangement screen is displayed in the details display area 403b in a case where the item "HOME SCREEN REARRANGEMENT" is selected in the setting item area 403a of the settings screen 403 in FIG. 4C.

An icon rearrangement screen 510 illustrated in FIG. 5A is a screen that reproduces the list display on the home screen 200 and a movement operation by a touch operation, using a description language, such as JavaScript. The tabs on which the icons on the home screen 200 are arranged are displayed in an area 512. While in the example of FIG. 5A, the tabs on which the icons are arranged are displayed in the area 512, a tab on which no icon is arranged may also be displayed. The area 512 of the icon rearrangement screen 510 may not be displayed depending on the type, version, or environment of the web browser 114a of the PC 114. In addition, even in a case where the area 512 is displayed, a rearrangement operation by a drag and drop operation may not be able to be received. In this case, the user can switch the icon rearrangement screen 510 illustrated in FIG. 5A to the icon rearrangement screen 520 illustrated in FIG. 5B by pressing a "BUTTON DISPLAY/LIST DISPLAY" button 511.

In a case where the user selects the "BUTTON DISPLAY/LIST DISPLAY" button 511 on the icon rearrangement screen 520 in FIG. 5B, the image forming apparatus 100 performs the following processing. The image forming apparatus 100 acquires information about the arrangement of the icons and the names given to the icons in order from the first tab, and generates screen information for reproducing the LUI. After the icon arrangement information and the name information about every tab with an icon arranged thereon or about all tabs are acquired and the screen information is generated, the generated screen information is transmitted to the PC 114. The PC 114 displays a screen based on the screen information received from the image forming apparatus 100, so that the icon rearrangement screen 510 illustrated in FIG. 5A is displayed.

Unlike the display method of the LUI, the icon rearrangement screen 520 in FIG. 5B displays the icons on the home screen 200 in list form. The icon rearrangement screen 520 includes a guide table 521 and an icon list 522. The guide table 521 indicates the display position and position number of each of the icons on the home screen 200, and the icon list 522 is a list of the icons on the home screen 200. The image forming apparatus 100 controls the display of the icon rearrangement screen 520 and provides the screen information to the PC 114 via the network I/F 111. At the top of the icon list 522, a tab name 523 ("a" in this example) is displayed. The icon list 522 displays icons 525 in list form based on the button IDs associated with each tab number in the display order array 303 in order matching the position numbers in the guide table 521. Numbers 524 are numbers each corresponding to a position for displaying an icon. The numbers 524 correspond to the numbers of the guide table 521. Furthermore, a button name 526, an application name 527, and an operation button 528 are displayed in association with each of the icons 525. The operation button 528 includes an up-arrow button 528a, a down-arrow button 528b, and a tab button 528c to be pressed to issue an instruction to move a corresponding one of the icons 525. When the tab button 528c is pressed, a movement destination list 529 that lists tab names appears.

For example, when the up-arrow button 528a for the second icon in the icon list 522 is pressed, the image forming apparatus 100 transposes the second icon and the first icon that is located above the second icon on the icon list 522. When the down-arrow button 528b for the second icon is pressed, the image forming apparatus 100 transposes the second icon and the third icon that is located below the second icon on the icon list 522. When the tab button 528c for the second icon is pressed, the image forming apparatus 100 displays the movement destination list 529 for the second icon.

FIG. 6 is a flowchart illustrating processing for controlling the display of the icon rearrangement screen 520. The processing illustrated in the flowchart in FIG. 6 is implemented by the CPU 105 loading a control program stored in the ROM 107 into the RAM 106 and executing the program. The processing illustrated in the flowchart is started in a case where, for example, the image forming apparatus 100 determines that the item "HOME SCREEN REARRANGEMENT" is selected in the setting item area 403a of the settings screen 403 in FIG. 4C based on the operation information received from the PC 114. The processing illustrated in FIG. 6 is started also in a case where the "BUTTON DISPLAY/LIST DISPLAY" button 511 is selected in FIG. 5A.

First, in S601, the CPU 105 acquires the display order array 303 from the ROM 107 and sets the tab number X of the element [X][Y] to 1. In S603, the CPU 105 displays the tab name corresponding to the tab number X on the icon rearrangement screen 520. In S604, the CPU 105 sets the position number Y of the element [X][Y] to 1. In S606, the CPU 105 determines whether the element [X][Y] has a button ID. In a case where the CPU 105 determines that the element [X][Y] has a button ID (NO in S606), then in S608, the CPU 105 displays the icon and the button name corresponding to the button ID.

In S609, in a case where the icon corresponding to the button ID in the element [X][Y] is not at the top position in the tab (NO in S609), since the icon is movable to the position before the current position in the tab, then in S610, the CPU 105 displays the up-arrow button 528a in the area of the operation button 528. The up-arrow button 528a is an example of a movement button configured to issue an instruction to move an icon to the position immediately before the current position in the tab. On the other hand, in a case where the icon corresponding to the button ID in the element [X][Y] is at the top position in the tab (YES in S609), since the icon is not movable to the position before the current position in the tab, the CPU 105 does not display the up-arrow button 528a.

Similarly in S611, in a case where the icon corresponding to the button ID in the element [X] [Y] is not at the last position in the tab (NO in S611), since the icon is movable to the position after the current position in the tab, then in S612, the CPU 105 displays the down-arrow button 528b in the area of the operation button 528. The down-arrow button 528b is an example of a movement button configured to issue an instruction to move an icon to the position immediately after the current position in the tab. On the other hand, in a case where the icon corresponding to the button ID in the element [X][Y] is at the last position in the tab (YES in S611), since the icon is not movable to the position after the current position in the tab, the CPU 105 does not display the down-arrow button 528b.

In S613, the CPU 105 displays the tab button 528c in the area of the operation button 528.

The tab button 528c is an example of an instruction button configured to issue an instruction to move an icon to another tab (page).

In S614, the CPU 105 increments the position number Y and repeats the processing in S608 to S613 as long as the number of icons in the tab does not reach the upper limit (NO in S605) and a button ID is present in the element [X][Y] (NO in S606). In a case where the button IDs of all the icons in the tab are processed (YES in S605 or YES in S606), then in S607, the CPU 105 increments the tab number X, and the processing proceeds to S603. In S603, the tab name 523 is displayed before the first icon in the tab. As long as the number of tabs does not reach the upper limit (NO in S602), the CPU 105 increments the tab number X in S607 and repeats the processing in S603 to S614. In a case where the number of tabs reaches the upper limit (YES in S602), the processing illustrated in FIG. 6 ends. The CPU 105 describes the screen information about the icon rearrangement screen 520, which has been generated as described above, in a form that can be displayed on the web browser 114a of the PC 114, and provides the screen information to the PC 114.

As described above, the image forming apparatus 100 rearranges the icons displayed on the home screen 200 having a tab structure, in list form and displays the rearranged icons on the RUI. In addition, the icon list 522 is separately provided for each tab. Thus, the icons displayed in each tab of the home screen 200 are easy to recognize with great visibility. Furthermore, the image forming apparatus 100 displays the up-arrow button 528a, the down-arrow button 528b, and the tab button 528c in association with each of the icons 525 displayed in list form. This enables the icons to be moved not only to the position before or after the current position in the tab but also to another tab.

Figure 7A:
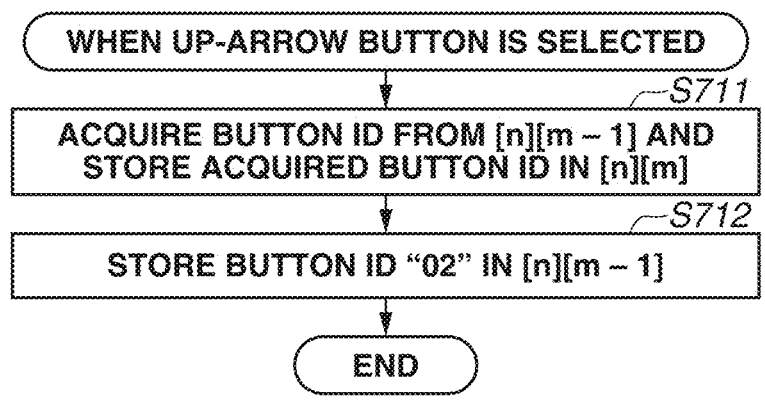
FIGS. 7A to 7C are flowcharts illustrating icon movement control processing.
Figure 7B:
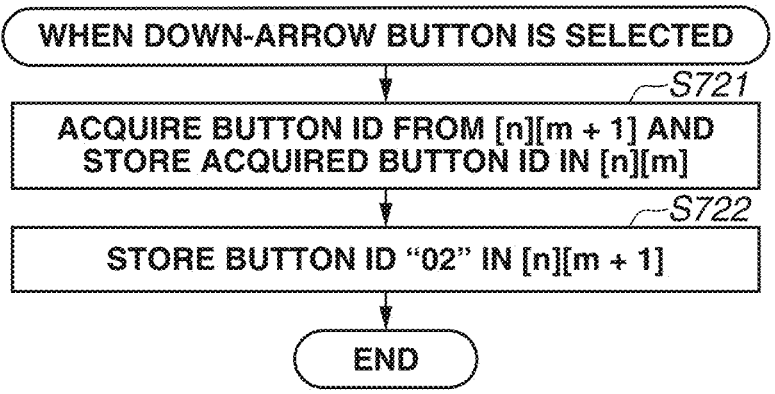
Figure 7C:
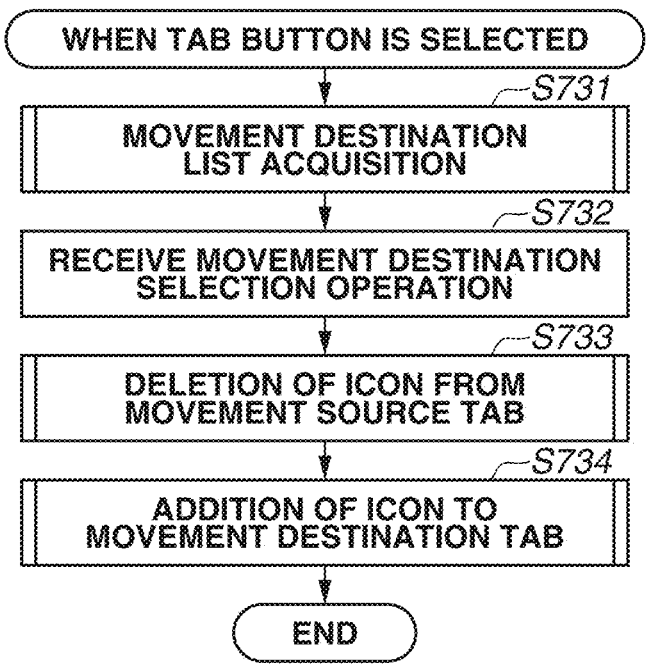

FIGS. 7A to 7C are flowcharts illustrating processing for controlling the movement of the icons displayed on the LUI, in response to an operation on the buttons displayed in the area of the operation button 528 on the icon rearrangement screen 520 generated by the processing in FIG. 6. The processing in the flowcharts in FIGS. 7A to 7C is implemented by the CPU 105 loading a control program stored in the ROM 107 into the RAM 106 and executing the program. The processing illustrated in the flowcharts are started in a case where, for example, the image forming apparatus 100 determines that the operation button 528 is pressed on the icon rearrangement screen 520, based on the operation information received from the PC 114. An icon associated with the pressed operation button 528 will be referred to as a "target icon". Hereinafter, a case where the target icon corresponds to a button ID "02" stored in an element [n][m] in the display order array 303 will be described as an example.

FIG. 7A is a flowchart illustrating processing to be performed in response to an operation on the up-arrow button 528a. In a case where the CPU 105 determines that the up-arrow button 528a is pressed, the CPU 105 acquires a button ID from an element [n][m−1] immediately before the element [n][m]. In S711, the CPU 105 stores the acquired button ID in the element [n][m]. In S712, the CPU 105 stores the button ID "02" in the element [n][m−1]. Then, the processing illustrated in FIG. 7A ends.

FIG. 7B is a flowchart illustrating processing to be performed in response to an operation on the down-arrow button 528b. In a case where the CPU 105 determines that the down-arrow button 528b is pressed, the CPU 105 acquires a button ID from an element [n][m+1] immediately after the element [n][m]. In S721, the CPU 105 stores the acquired button ID in the element [n][m]. In S722, the CPU 105 stores the button ID "02" in the element [n][m+1]. Then, the processing illustrated in FIG. 7B ends.

According to the processing illustrated in the flowcharts in FIGS. 7A and 7B described above, the image forming apparatus 100 moves the target icon to the position immediately before or after the current position in the tab on the LUI.

Furthermore, the image forming apparatus 100 performs the processing illustrated in FIG. 7A or 7B and then performs the processing illustrated in FIG. 6 based on the updated display order array 303, so that the icons 525 in the icon list 522 on the icon rearrangement screen 520 are transposed vertically and displayed at the transposed positions.

FIG. 7C is a flowchart illustrating processing to be performed in response to an operation on the tab button 528c. In a case where the CPU 105 determines that the tab button 528c is pressed, then in S731, the CPU 105 acquires the movement destination list 529 for the target icon. Next, the CPU 105 provides display information about the movement destination list 529 to the PC 114. Accordingly, the movement destination list 529 is displayed for the target icon on the RUI. In S732, in a case where the image forming apparatus 100 determines that a movement destination is selected via the PC 114, then in S733, the CPU 105 deletes the target icon (the icon corresponding to the button ID "02") from the movement source tab. In S734, the CPU 105 adds the target icon (the icon corresponding to the button ID "02") to the movement destination tab. Then, the processing illustrated in FIG. 7C ends.

According to the processing in the flowchart in FIG. 7C described above, the image forming apparatus 100 displays the movement destination list 529 in response to the press of the tab button 528c, and in a case where a movement destination tab is selected from the movement destination list 529, the target icon is moved to the selected tab on the LUI. Furthermore, the image forming apparatus 100 performs the processing illustrated in FIG. 7C and then performs the processing illustrated in FIG. 6 based on the updated display order array 303, so that the target icon on the icon rearrangement screen 520 is displayed at the position of the selected tab.

Next, details of the processing in FIG. 7C will be described with reference to FIGS. 8A to 8C. A case where the tab with the tab number X=n2 is selected as the movement destination in S732 will be described as an example.

Figure 8A:
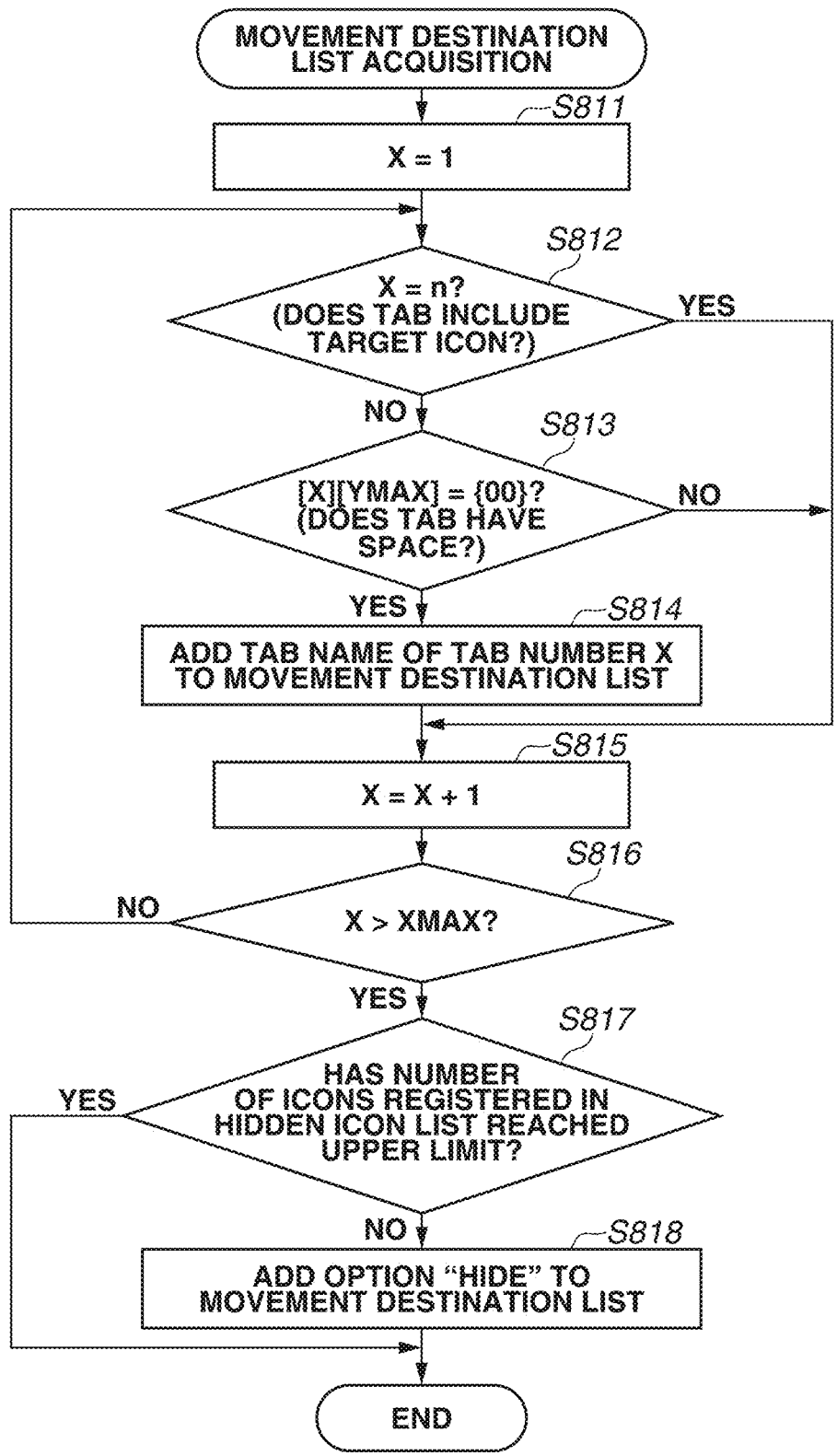
FIGS. 8A to 8C are flowcharts illustrating details of processing illustrated in FIG. 7C.

FIG. 8A is a flowchart illustrating details of the movement destination list acquisition processing in S731. First, in S811, the tab number X of the element [X][Y] is set to 1. In S812, the CPU 105 determines whether the tab number X matches the tab number n of the tab including the target icon. In S813, the CPU 105 determines whether the tab with the tab number X has a space therein. As a result of the determinations in S812 and S813, in a case where the tab does not include the target icon (NO in S812) and has a space therein (YES in S813), then in S814, the CPU 105 adds the tab name of the tab with the tab number X to the movement destination list 529. Then, the CPU 105 repeats the processing in S812 to S814 until the tab number X reaches the upper limit of the number of tabs in S815 and S816. In S817, the CPU 105 determines whether the number of icons registered in the hidden icon list array 304 has reached the upper limit. In a case where the upper limit is not reached (NO in S817), then in S818, the CPU 105 adds the option "HIDE" to the movement destination list 529. Then, the processing returns to the flowchart in FIG. 7C.

According to the processing in the flowchart in FIG. 8A described above, in a case where the tab button 528c is operated, the image forming apparatus 100 lists tab names as the movement destinations of the icon associated with the operated tab button 528c. In other words, the user who uses the RUI of the PC 114 can move an icon to a desired tab simply by selecting the corresponding tab name from the movement destination list 529. In addition, since the movement destination list 529 is displayed in response to a user's operation, the visibility of the icons 525 displayed in list form is not degraded.

Furthermore, when listing the tab names, the image forming apparatus 100 does not display the tab name of the tab including the target icon or the tab name of a tab having no space therein. In other words, the image forming apparatus 100 displays the tab names of the tabs to which the target icon is movable. This further enhances user operability in selecting a tab name as the movement destination.

Figure 8B:
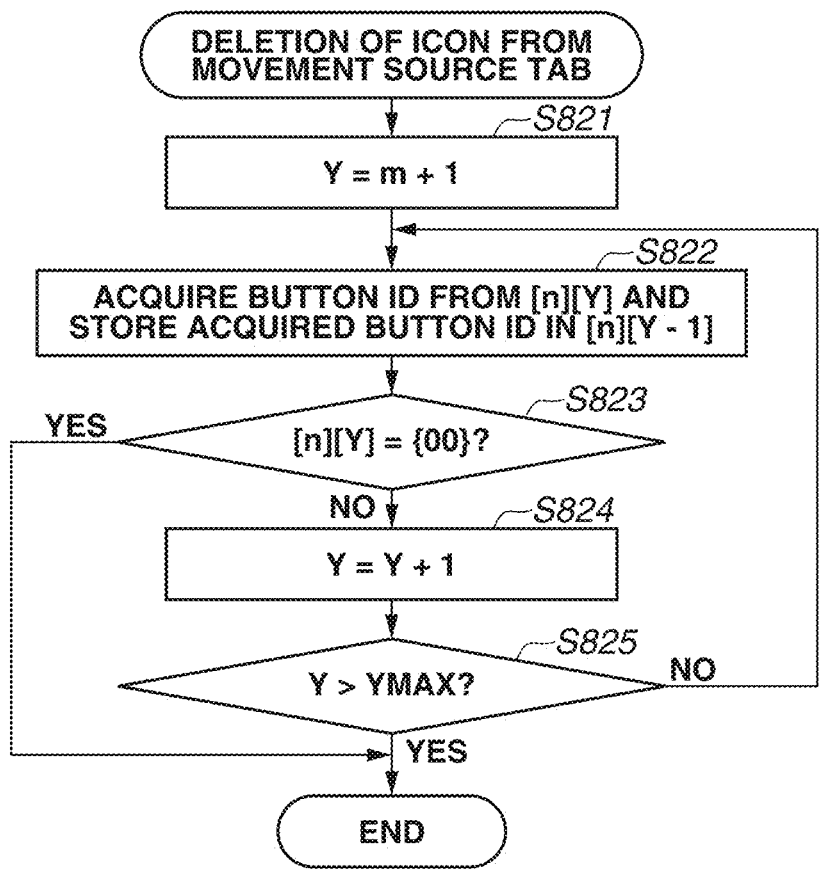

FIG. 8B is a flowchart illustrating details of the processing for deleting the target icon (the icon corresponding to the button ID "02") from the movement source tab in S733. First, in S821, the position number Y of the element [n][Y] is set to m+1. In S822, the CPU 105 acquires a button ID from the element [n][m+1] immediately after the element [n][m] and stores the acquired button ID in the element [n][m]. In S824, the CPU 105 increments the position number Y, and repeats the processing in S822 as long as the element [n][Y] has a button ID (NO in S823) and the upper limit of the number of icons in the tab is not reached (NO in S825). Then, the processing returns to the flowchart in FIG. 7C.

Figure 8C:
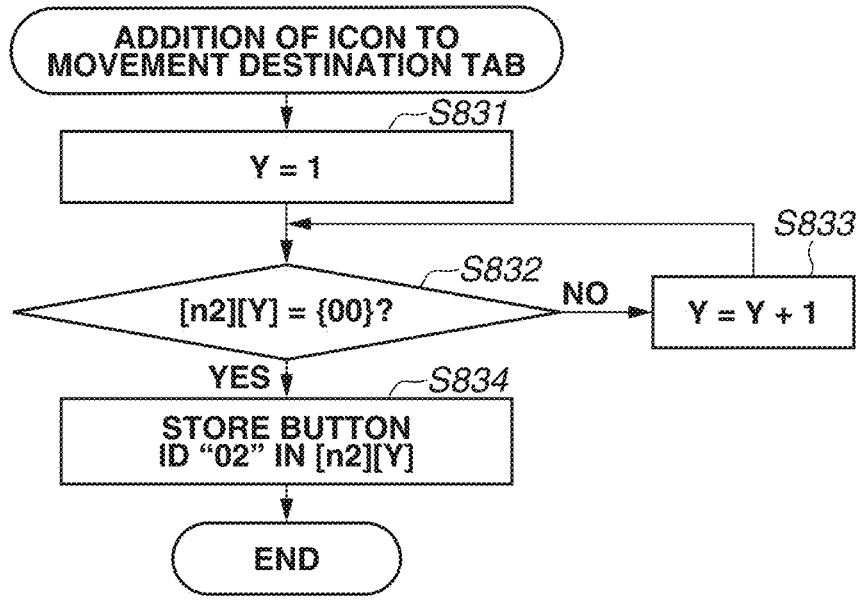

FIG. 8C is a flowchart illustrating details of the processing for adding the target icon (the icon corresponding to the button ID "02") to the movement destination tab in S734. First, in S831, the position number Y of an element [n2][Y] is set to 1. In S832 and S833, the CPU 105 searches the element [n2][Y] starting from the head position of the tab number X=n2 until a position without a button ID is detected. Then, in S834, the CPU 105 stores the button ID "02" of the target icon in the element [n2][Y] having no button ID. Then, the processing returns to the flowchart in FIG. 7C.

According to the processing in the flowcharts in FIGS. 8B and 8C described above, in a case where a tab name is selected from the listed tab names, the image forming apparatus 100 deletes the target icon from the movement source tab. Then, the image forming apparatus 100 sequentially moves the icons displayed after the target icon on the movement source tab to the positions immediately above the current positions. Accordingly, the icons remaining on the movement source tab can be top left justified. Furthermore, the image forming apparatus 100 moves the target icon to the last position on the tab with the selected tab name. In this way, the image forming apparatus 100 performs processing for moving the target icon to another tab.

In a case where the option "HIDE" displayed in the movement destination list 529 is selected, the image forming apparatus 100 performs the hidden icon setting. More specifically, the button ID of the target icon is registered in the hidden icon list array 304. In the present exemplary embodiment, the option "HIDE" is also displayed in the movement destination list 529, so that an icon movement operation and an icon hiding operation can be performed as a series of operations.

While in the present exemplary embodiment, the configuration where tab names are listed as the movement destinations of the target icon in response to an operation on the tab button 528c has been described above, in a case where the number of tab names as the movement destinations is one, the processing for moving the target icon to another tab may be performed without the list display of the tab name as the movement destination. In this case, the processing in S731 and S732 in FIG. 7C is to be skipped.

According to the present exemplary embodiment described above, even in a case where the LUI is not reproducible with high fidelity due to the specifications of the web browser 114a of the PC 114, the RUI that enables the display and movement of the icons in a similar manner to the LUI can be provided. In other words, user visibility and operability in using the RUI can be enhanced. Furthermore, support for web accessibility can be enhanced and, for example, web accessibility for voice reading can also be achieved.

The home screen according to the first exemplary embodiment has a tab structure display format, and each tab of the home screen is independently configured. A home screen according to a second exemplary embodiment has a page structure display format, and pages on the home screen are continuously configured. Furthermore, in the second exemplary embodiment, an icon selected on the LUI can be displayed hierarchically in association with another icon. For example, in a case where an icon is selected on the icon rearrangement mode screen 220 on the LUI and the selected icon is superimposed on another icon by a drag and drop operation, the image forming apparatus 100 displays the selected icon at a hierarchical level lower than that of the other icon. Hereinafter, redundant descriptions of components similar to those in the first exemplary embodiment will be omitted.

FIG. 9 illustrates a data structure that manages the display order of the icons on the home screen according to the present exemplary embodiment. In the present exemplary embodiment, the image forming apparatus 100 manages the display order by using a display order array 1003 having the position numbers of the icons on the home screen. The position numbers include a first position number and a second position number. The first position number specifies the display position of an icon on each page, and the second position number specifies the display position of an icon at a hierarchical level below the icon (the folder in this example) at the display position specified by the first position number. For example, the position number of the icon displayed at the sixth display position on a first page 1001 of the home screen is specified as (6, 0), and the position number of the icon in the folder is specified as (6, 1). In the present exemplary embodiment, the first position numbers are sequentially given to the icons starting from the first page 1001 of the home screen. Thus, in a case where the number of first position numbers reaches the upper limit (eight in this example) of the number of icons displayable in each page, one page is delimited, and each time the number of first position numbers reaches the upper limit of the number of icons, another page is delimited. For example, the icon with the first position number (9, 0) is displayed at the top position in a second page 1002 of the home screen.

Figure 10:
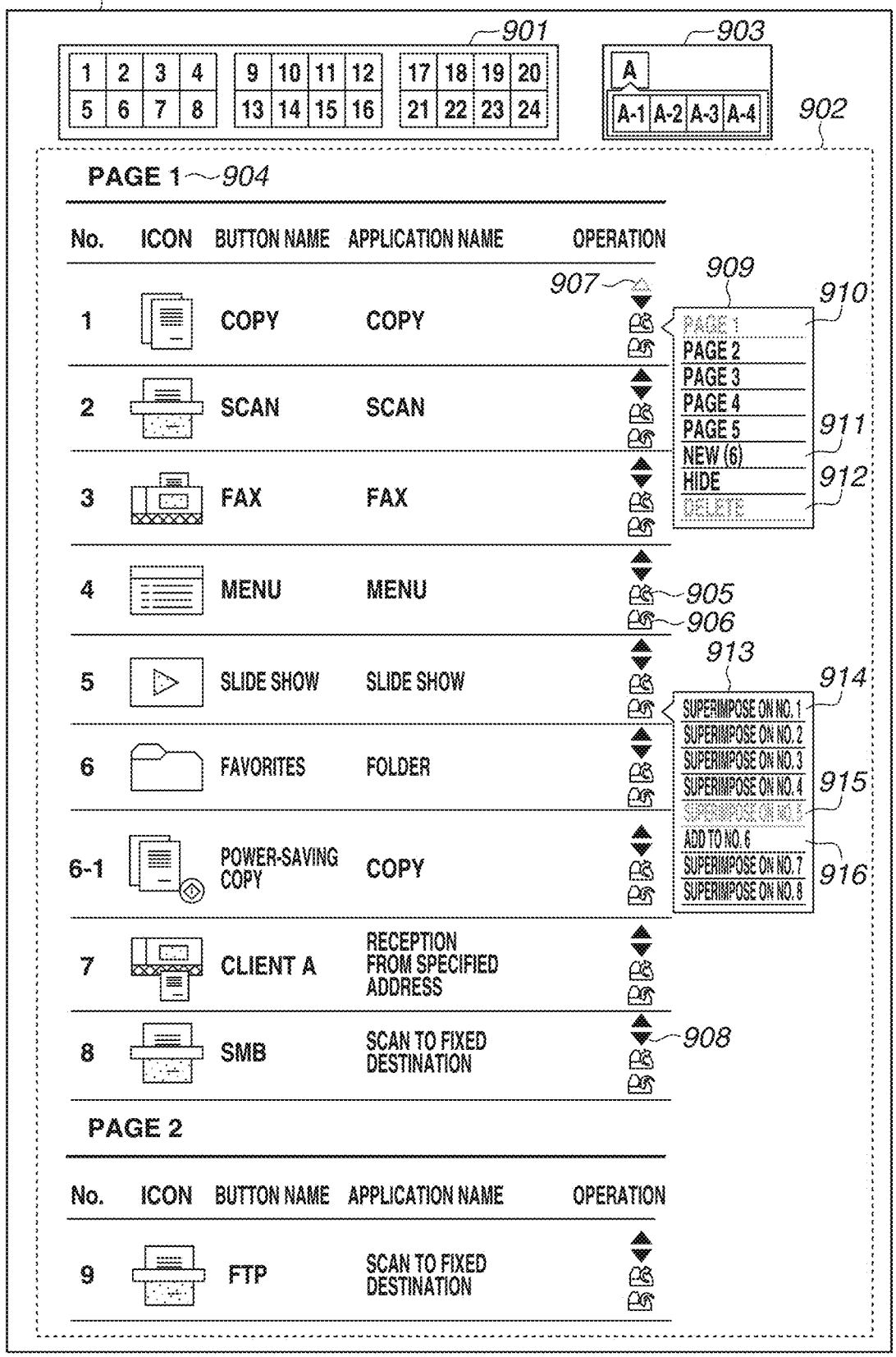
FIG. 10 is a diagram illustrating an example of an icon rearrangement screen according to the second exemplary embodiment.

FIG. 10 illustrates an icon rearrangement screen 900 of the RUI according to the present exemplary embodiment. The icon rearrangement screen 900 includes guide tables 901 and 903 and an icon list 902. The guide table 901 specifies the display positions of the icons on the home screen and the first position numbers thereof. The guide table 903 specifies the display positions of the icons in the folder and the second position numbers thereof. The icon list 902 lists the icons on the home screen. The image forming apparatus 100 controls the display of the icon rearrangement screen 900 and provides screen information about the icon rearrangement screen 900 to the PC 114 via the network I/F 111. A page name 904 ("PAGE 1" in this example) is displayed at the top of the icon list 902. The icon list 902 displays the icons in list form in order matching the position numbers specified in the guide tables 901 and 903. Furthermore, a button name, an application name, and an operation button are displayed in association with each of the icons.

The operation button includes an up-arrow button 907, a down-arrow button 908, a page button 905, and a folder button 906 to be pressed to issue an instruction to move the corresponding icon. In a case where the page button 905 is pressed, a movement destination list 909 is displayed based on the target icon to be operated and the display order array 1003. The page button 905 is an example of an instruction button configured to issue an instruction to move an icon to another page. In a case where the folder button 906 is pressed, a folder list 913 is displayed based on the target of the icon to be operated and the display order array 1003. The folder button 906 is an example of an instruction button configured to issue an instruction to move an icon to another hierarchical level.

While in the first exemplary embodiment, the up-arrow button 528a is not displayed in a case where the target icon is at the top position in the tab (YES in S609), the up-arrow button 907 is grayed out in the present exemplary embodiment.

While in the first exemplary embodiment, the down-arrow button 528b is not displayed in a case where the target icon is at the last position in the tab (YES in S611), the down-arrow button 908 is displayed in the present exemplary embodiment because the pages are continuously displayed.

While in a case where the tab includes the target icon (YES in S812), the tab name is not displayed in the movement destination list 529 in the first exemplary embodiment, a page name 910 of the page including the target icon is grayed out in the movement destination list 909 in the present exemplary embodiment.

Furthermore, the image forming apparatus 100 adds options 911 and 912 to the movement destination list 909. The option 911 enables the user to issue an instruction to generate a new page as the movement destination of the target icon. The option 912 enables the user to issue an instruction to delete the target icon. As described above, not only the option "HIDE" but also the option 911 for adding a new page and the option 912 for deleting the target icon are displayed in the movement destination list 909, so that the user can change various settings of the LUI screen with a series of operations. The option 912 for deleting the target icon is grayed out in a case where the target icon is not deletable due to the system.

The folder list 913 will be described next. In a case where the folder button 906 is pressed, the image forming apparatus 100 lists details of the processing for moving the target icon to another hierarchical level, using the display order array 1003. For example, since the icon with the button name "SLIDE SHOW" (No. 5) and the icon with the button name "COPY" (No. 1) can be combined into a folder, an option 914 named "SUPERIMPOSE ON No. 1" is included in the folder list 913 on the icon rearrangement screen 900. Since the icon with the button name "FAVORITES" (No. 6) is a folder, an option 916 named "ADD TO No. 6" is included in the folder list 913 for the icon with the button name "SLIDE SHOW" (No. 5.). Furthermore, since the icon with the button name "SLIDE SHOW" (No. 5) cannot be combined with the icon with the button name "SLIDE SHOW" (No. 5) into a folder, so that an option 915 named "SUPERIMPOSE ON NO. 5" in the folder list 913 is grayed out.

According to the present exemplary embodiment described above, the RUI that enables the display and movement of the icons in a similar manner to the LUI can be provided. In other words, user visibility and operability in using the RUI can be enhanced. Furthermore, support for web accessibility can be enhanced and, for example, web accessibility for voice reading can also be achieved.

The above-described exemplary embodiments illustrate specific examples for implementing aspects of the present disclosure, and the technical scope of every embodiment should not be interpreted in a limited manner by the exemplary embodiments. The exemplary embodiments can be implemented in various forms without departing from the technical concept or main features.

Some embodiments can also be implemented by supplying a program for implementing one or more functions according to the above-described exemplary embodiments to a system or an apparatus via a network or a recording medium, and causing one or more processors in a computer of the system or the apparatus to read and execute the program. The exemplary embodiments can also be implemented by a circuit (e.g., an application-specific integrated circuit (ASIC)) for implementing one or more functions according to the above-described exemplary embodiments.

The exemplary embodiments can enhance user visibility and operability in using the RUI.

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-000837, which was filed on Jan. 6, 2021 and which is hereby incorporated by reference herein in its entirety.

What is claimed is:

1. An information processing apparatus configured to connect to an external apparatus, the information processing apparatus comprising:
a controller configured to:
control names of icons to be arranged and displayed in list form on a remote user interface provided to the external apparatus accessing the information processing apparatus, wherein the icons are displayed on a plurality of pages on a local user interface of the information processing apparatus;
control movement of the icons displayed on the local user interface, according to an operation on the remote user interface;
cause a display of the external apparatus to display a first instruction button in association with a name corresponding to an icon included in the names displayed in list form, the first instruction button being configured to instruct the controller to move one or more of the icons from a page to another page in the plurality of pages; and
cause the display of the external apparatus to display a first movement button in association with the name included in the names displayed in list form in a case where the icon is located at a position different from a predetermined position on the page, the first movement button being configured to instruct the controller to move the icon to a position immediately before the position on the page, and cause the display of the external apparatus not to display the first movement button operably in association with the name in a case where the icon is located at the predetermined position on the page.

2. The information processing apparatus according to claim 1, wherein in a case where the first instruction button is operated, the controller lists page names of pages as movement destinations of a target icon among the plurality of pages, a name corresponding to the target icon being the name associated with the operated first instruction button.

3. The information processing apparatus according to claim 2, wherein when listing the page names, the controller causes the display of the external apparatus to display the page names of the pages to which the target icon is movable, and hides a page name of a page to which the target icon is not movable among the plurality of pages.

4. The information processing apparatus according to claim 2, wherein in a case where a page name is selected from the listed page names, the controller performs processing for moving the target icon to the page with the selected page name.

5. The information processing apparatus according to claim 2, wherein in a case where the first instruction button is operated, the controller causes the display of the external apparatus to display a first option configured to instruct the controller to hide the target icon on the local user interface.

6. The information processing apparatus according to claim 5, wherein in a case where a number of icons set to be hidden among the icons reaches an upper limit, the controller causes the display of the external apparatus not to display the first option.

7. The information processing apparatus according to claim 5, wherein in a case where the first option is selected, the controller sets the target icon to be hidden on the local user interface.

8. The information processing apparatus according to claim 2, wherein in a case where the first instruction button is operated, the controller causes the display of the external apparatus to display a second option configured to instruct the controller to delete the target icon.

9. The information processing apparatus according to claim 2, wherein in a case where the first instruction button is operated, the controller causes the display of the external apparatus to display a third option configured to instruct the controller to generate a new page as the movement destination of the target icon.

10. The information processing apparatus according to claim 1, wherein in a case where the first movement button is operated, the controller performs processing for moving the icon associated with the operated first movement button to the position immediately before the position on the page.

11. The information processing apparatus according to claim 1, wherein the controller causes the display of the external apparatus to display a second movement button in association with the name included in the names displayed in list form in a case where the name is located at a position different from another predetermined position, the second movement button being configured to instruct the controller to move the icon to a position immediately after the position on the page, and does not display the second movement button in association with the image in a case where the name of the icon is located at said another predetermined position.

12. The information processing apparatus according to claim 11, wherein in a case where the second movement button is operated, the controller performs processing for moving the icon associated with the operated second movement button to the position immediately after the position on the page.

13. The information processing apparatus according to claim 1, wherein the controller is further configured to manage display order of the icons on the local user interface based on page numbers and position numbers,
wherein the controller causes the display of the external apparatus to display the names in list form separately for each of the page numbers in order based on the position numbers.

14. The information processing apparatus according to claim 1,
wherein the local user interface displays one of the names hierarchically in association with one of the other names, and
wherein the controller causes the display of the external apparatus to display a second instruction button in association with the name included in the names displayed in list form, the second instruction button being configured to instruct the controller to move the name to another hierarchical level.

15. The information processing apparatus according to claim 14, wherein in a case where the second instruction button is operated, the controller lists processing details about the movement of the icon associated with the operated second instruction button to the other hierarchical level.

16. The information processing apparatus according to claim 1, wherein the remote user interface is displayed by a web browser of the external apparatus.

17. The information processing apparatus according to claim 1, wherein each of the icons is configured to issue an instruction to execute an application or a function of the information processing apparatus.

18. The information processing apparatus according to claim 1, wherein the names correspond to icons displayed on the local user interface of the information processing apparatus.

19. A method for controlling an information processing apparatus configured to connect to an external apparatus, the method comprising:
controlling names of icons to be arranged and displayed in list form on a remote user interface provided to the external apparatus accessing the information processing apparatus, wherein the icons are displayed on a plurality of pages on a local user interface of the information processing apparatus;
controlling movement of the icons displayed on the local user interface, according to an operation on the remote user interface;
causing a display of the external apparatus to display a first instruction button in association with a name corresponding to an icon included in the names displayed in list form, the first instruction button being configured to issue an instruction to move one or more of the icons from a page to another page in the plurality of pages; and
causing the display of the external apparatus to display a first movement button in association with the name included in the names displayed in list form in a case where the icon is located at a position different from a predetermined position on the page, the first movement button being configured to issue an instruction to move the icon to a position immediately before the position on the page, and causing the display of the external apparatus not to display the first movement button operably in association with the name in a case where the icon is located at the predetermined position on the page.

20. A non-transitory computer-readable storage medium storing a program for causing a computer to perform a method for controlling an information processing apparatus configured to connect to an external apparatus, the method comprising:
controlling names of icons to be arranged and displayed in list form on a remote user interface provided to the external apparatus accessing the information processing apparatus, wherein the icons are displayed on a plurality of pages on a local user interface of the information processing apparatus;
controlling movement of the icons displayed on the local user interface, according to an operation on the remote user interface;
causing a display of the external apparatus to display a first instruction button in association with a name corresponding to an icon included in the names displayed in list form, the first instruction button being configured to issue an instruction to move one or more of the icons from a page to another page in the plurality of pages; and
causing the display of the external apparatus to display a first movement button in association with the name included in the names displayed in list form in a case where the icon is located at a position different from a predetermined position on the page, the first movement button being configured to issue an instruction to move the icon to a position immediately before the position on the page, and causing the display of the external apparatus not to display the first movement button operably in association with the name in a case where the icon is located at the predetermined position on the page.

\* \* \* \* \*